US012469114B2

(12) United States Patent
Ma et al.

(10) Patent No.: US 12,469,114 B2
(45) Date of Patent: Nov. 11, 2025

(54) METHOD, DEVICE, SYSTEM, ELECTRONIC DEVICE, AND STORAGE MEDIUM FOR IMAGE PROCESSING (71) Applicants: ADVANCED INSTITUTE OF INFORMATION TECHNOLOGY (AIIT), PEKING UNIVERSITY, Hangzhou (CN); Peking University, Beijing (CN)

(72) Inventors: Siwei Ma, Hangzhou (CN); Yun Jiang, Hangzhou (CN); Bo Teng, Hangzhou (CN); Jianhui Chang, Hangzhou (CN); Wen Gao, Hangzhou (CN)

(73) Assignees: ADVANCED INSTITUTE OF INFORMATION TECHNOLOGY (AIIT), PEKING UNIVERSITY, Hangzhou (CN); PEKING UNIVERSITY, Beijing (CN)

(*) Notice: Subject to any disclaimer, the term of this patent is extended or adjusted under 35 U.S.C. 154(b) by 0 days.

(21) Appl. No.: 19/249,884

(22) Filed: Jun. 25, 2025

(65) Prior Publication Data
US 2025/0328992 A1 Oct. 23, 2025

Related U.S. Application Data (63) Continuation of application No. PCT/CN2024/136446, filed on Dec. 3, 2024.

(30) Foreign Application Priority Data

Dec. 22, 2023 (CN) .......................... 202311782836.7

(51) Int. Cl.
G06K 9/00 (2022.01)
G06T 3/04 (2024.01)
(Continued)

(52) U.S. Cl.
CPC .................. *G06T 5/70* (2024.01); *G06T 3/04* (2024.01); *G06T 5/60* (2024.01); *G06T 2207/20081* (2013.01)

(58) Field of Classification Search
CPC .... G06T 5/70; G06T 3/04; G06T 5/60; G06T 2207/20081; G06T 9/00; G06T 9/001; G06T 9/002; G06T 9/007; G06T 9/008
See application file for complete search history.

(56) References Cited

U.S. PATENT DOCUMENTS

| 10,523,965 | B2* | 12/2019 | Wang .................... H04N 19/14 |
| 12,299,939 | B2* | 5/2025 | Harikumar ............. G06T 9/001 |
| 2021/0150337 | A1 | 5/2021 | Raziperchikolaei | |

FOREIGN PATENT DOCUMENTS

| CN | 112929666 A | 6/2021 | |
| CN | 116524048 A * | 8/2023 | ............. G06T 9/002 |

(Continued)

OTHER PUBLICATIONS

International Search Report and Written Opinion issued in Application No. PCT/CN2024/136446 mailed on Mar. 18, 2024 (7 pages).

Primary Examiner — Shervin K Nakhjavan
(74) Attorney, Agent, or Firm — Osha Bergman Watanabe & Burton LLP (57) ABSTRACT This application discloses an image processing method, device, system, electronic equipment, and storage medium, applied at the encoding end. The method includes extracting a one-dimensional feature vector from an original image block; transforming the original image block into a multi-dimensional feature map based on the one-dimensional feature vector; quantizing and encoding the one-dimensional feature vector to generate a first code stream; discretely encoding the multidimensional feature map to generate a second code stream, thereby efficiently compressing the (Continued)

spatial-independent vector and the multidimensional feature map; and sending the first and second code streams to the decoding end. Since the encoding stream comprises two layers each representing different types of image information, image reconstruction from the two-layer code streams maintains information integrity even at low bit rates, thus improving visual effects and experience.

16 Claims, 5 Drawing Sheets

(51) Int. Cl.
 *G06T 5/60* (2024.01)
 *G06T 5/70* (2024.01)

(56) References Cited

FOREIGN PATENT DOCUMENTS

| | | | | | |
|---|---|---|---|---|---|
| CN | 116631043 | A | | 8/2023 | |
| CN | 116631043 | B | * | 9/2023 | ........... G06V 40/172 |
| CN | 117170560 | A | | 12/2023 | |
| CN | 117459727 | A | | 1/2024 | |
| WO | 2013089004 | A1 | | 6/2013 | |
| WO | 2023044979 | A1 | | 3/2023 | |

* cited by examiner

(a) the extracting process of spatially independent feature vector (b) encoding/decoding based on diffusion models

METHOD, DEVICE, SYSTEM, ELECTRONIC DEVICE, AND STORAGE MEDIUM FOR IMAGE PROCESSING

CROSS-REFERENCE TO RELATED APPLICATIONS

This application is a bypass continuation application of International Patent Application Publication No. PCT/CN2024/136446, filed on Dec. 3, 2024, which claims priority to Chinese Patent Application Publication No. CN117459727 B, filed on Dec. 22, 2023, both of which are incorporated herein by reference.

TECHNICAL FIELD

The present application relates to the technical field of image processing, and more specifically, to an image processing method, device, electronic equipment, and storage medium.

BACKGROUND

With the development of artificial intelligence, traditional image coding standards (such as JPEG (Joint Photographic Experts Group), MPEG (Moving Picture Experts Group), AVS (Audio Video coding Standard), BPG (Better Portable Graphics), etc.) are optimized at the pixel level for human vision and do not adequately support various machine vision requirements. Researchers have attempted to incorporate neural networks into image coding to achieve more intelligent and efficient image compression. Therefore, neural network-based image coding using deep learning has become a key area of research. However, whether using traditional image coding standards or neural network encoding technology, the encoding bitstream is generally composed of a single code stream. This leads to significant information loss at low bitrates, resulting in poor image reconstruction quality and visual experience.

SUMMARY

The purpose of the present application is to overcome the deficiencies of the above-mentioned prior art by providing an image processing method, device, electronic equipment, and storage medium. This purpose is achieved through the following technical solutions.

A first aspect of the present application provides an image processing method, applied at the encoding end, the method includes:

Extracting a one-dimensional feature vector from an original image block;

Transforming the original image block into a multi-dimensional feature map based on the one-dimensional feature vector;

Quantizing and encoding the one-dimensional feature vector to obtain a first code stream;

Discretely encoding the multi-dimensional feature map to obtain a second code stream;

Sending the first and second code streams to the decoding end.

Based on the above first aspect, the image processing method of the present application has at least the following beneficial effects or advantages:

By extracting a one-dimensional feature vector from the original image block—a low-dimensional spatially-independent vector that contains the texture structure information of the image—and transforming it into a multi-dimensional feature map which contains spatially correlated and high-frequency information of the image, the two types of image information are efficiently encoded. The one-dimensional feature vector is quantized into the first code stream, and the multi-dimensional feature map is discretely encoded into the second code stream, enabling efficient compression of different levels of image information. Since the bitstream consists of two layers and contains multiple levels of image information, even at low bitrates, information loss is minimized. As a result, the reconstructed image obtained from the two-layer bitstream can enhance visual quality and user experience.

Optionally, transforming the original image block into a multi-dimensional feature map based on the one-dimensional feature vector includes: using a preset diffusion model to iteratively add noise to the original image block based on the one-dimensional feature vector, thereby obtaining the multi-dimensional feature map.

Optionally, the diffusion model includes a first noise prediction network and a noise addition layer. The step of adding noise iteratively includes: in each noise addition step, predicting the current noise using the first noise prediction network based on the previous noise-added result and the one-dimensional feature vector; adding the noise output by the first noise prediction network to the previous result through the noise addition layer; wherein, for the first noise addition, the previous result is the original image block.

Optionally, the step of adding the noise output by the first noise prediction network to the previous result includes: acquiring the previously used noise level coefficient and the current noise level coefficient; calculating the current noise-added result based on the previous coefficient, current coefficient, predicted noise, and the previous result.

Optionally, the quantization and encoding of the one-dimensional feature vector to generate the first code stream includes: applying a preset quantization encoding model to perform quantization and encoding to generate the first code stream.

Optionally, the quantization encoding model includes a feature encoding network, a quantization layer, and an entropy estimation network. The process includes: down-sampling the one-dimensional feature vector via the feature encoding network to obtain down-sampled features; converting the feature values of the down-sampled features into integer values using the quantization layer to obtain quantized features; encoding the quantized features into a first code stream using the entropy estimation network.

Optionally, discretely encoding the multi-dimensional feature map to generate the second code stream includes: applying a preset discrete encoding model to encode the multi-dimensional feature map.

Optionally, the discrete encoding model includes a feature encoding network, a discrete representation layer, and a code stream conversion layer. The encoding process includes: down-sampling the multi-dimensional feature map via the feature encoding network to obtain down-sampled features; applying discrete representation to the down-sampled features using the discrete representation layer to generate an index matrix; converting the index matrix into the second code stream using the code stream conversion layer.

Optionally, the step of performing discrete representation on the down-sampled features includes: matching each dimensional feature vector of the down-sampled features with the most similar vector in a preset feature dictionary; obtaining the index matrix using the indices of the matched vectors.

A second aspect of the present application provides an image processing method, applied at the decoding end, the method includes:
- receive the first code stream and second code stream from the encoding end;
- inverse-quantize and decode the first code stream to obtain a one-dimensional feature vector;
- inverse-discretely decode the second code stream to obtain the multi-dimensional feature map;
- reconstruct the image based on the one-dimensional feature vector and the multi-dimensional feature map to obtain the reconstructed image block.

Based on the above second aspect, the image processing method of the present application has at least the following beneficial effects or advantages:
- since the received first and second code streams contain different levels of image information (the first carries texture style information and the second carries high-frequency and structural information), the reconstructed image obtained by decoding both streams offers enhanced visual quality and preserves more information even under limited bandwidth conditions.

Optionally, the step of inverse-quantizing and decoding the first code stream includes: inverse-quantizing and decoding the first code stream through a preset inverse quantization decoding model to obtain the one-dimensional feature vector;
the inverse quantization decoding model comprises an entropy decoding network, an inverse quantization layer, and a feature decoding network; the decoding step includes decoding the first code stream into quantized features using the entropy decoding network; converting the quantized features to floating-point values via the inverse quantization layer to obtain inverse quantized features; up-sampling the inverse quantized features through the feature decoding network to obtain the one-dimensional feature vector.

Optionally, the step of inverse-discretely decoding the second code stream includes: inverse-discretely decoding the second code stream through a preset discrete decoding model to obtain the multi-dimensional feature map;
the discrete decoding model comprises a code stream decoding layer, an inverse discrete representation layer, and a feature decoding network; the decoding step includes decoding the second code stream into an index matrix via the code stream decoding layer; converting the index matrix to continuous features through the inverse discrete representation layer using a preset feature dictionary; up-sampling the continuous features via the feature decoding network to obtain the multi-dimensional feature map.

Optionally, the step of reconstructing the image based on the one-dimensional feature vector and the multi-dimensional feature map includes iteratively denoising the multi-dimensional feature map multiple times using the one-dimensional feature vector through a preset diffusion model, thereby obtaining the reconstructed image block.

Optionally, the diffusion model comprises a second noise prediction network and a denoising layer; the iterative denoising step includes predicting the current noise using the second noise prediction network based on the previous denoising result and the one-dimensional feature vector for each denoising process; denoising the previous denoising result using the noise output by the second noise prediction network via the denoising layer; wherein for the first denoising process, the previous denoising result is the multi-dimensional feature map.

Optionally, the denoising step via the denoising layer includes: acquiring the previously used noise level coefficient and the current noise level coefficient; obtaining the current denoising result based on the previously used noise level coefficient, the current noise level coefficient, the noise output by the second noise prediction network, and the previous denoising result.

A third aspect of the present application provides an image processing device, applied at the encoding end, the device comprising:
- a first extraction module, used to extract a one-dimensional feature vector from an original image block;
- a second extraction module, used to transform the original image block into a multi-dimensional feature map based on the one-dimensional feature vector;
- a first encoding module, used to quantize and encode the one-dimensional feature vector to obtain the first code stream;
- a second encoding module, used to discretely encode the multi-dimensional feature map to obtain the second code stream;
- a sending module, used to send the first code stream and the second code stream to the decoding end.

A forth aspect of the present application provides an image processing device, applied at the decoding end, the device comprising:
- a receiving module, configured to receive a first code stream and a second code stream from the encoding end;
- a first decoding module, configured to inverse-quantize and decode the first code stream to obtain a one-dimensional feature vector;
- a second decoding module, configured to inverse-discretely decode the second code stream to obtain a multi-dimensional feature map;
- a reconstruction module, configured to reconstruct an image based on the one-dimensional feature vector and the multi-dimensional feature map to obtain a reconstructed image block.

A fifth aspect of the present application provides an image processing system, the system comprising:
- an encoding end, configured to perform the image processing method according to the first aspect;
- a decoding end, configured to perform the image processing method according to the second aspect.

A sixth aspect of the present application provides an electronic device, comprising a memory, a processor, and a computer program stored on the memory and executable on the processor, characterized in that the processor executes the program to implement the method according to the first aspect or the second aspect.

A seventh aspect of the present application provides a computer-readable storage medium, on which a computer program is stored, characterized in that the program is executed by a processor to implement the method according to the first aspect or the second aspect.

The foregoing description is merely an overview of the technical solution of the present application. To understand the technical means of the present application more clearly, reference may be made to the content of the specification for implementation. Furthermore, to make the above-mentioned and other objectives, features, and advantages of the present application more apparent and comprehensible, specific implementations of the present application are exemplified below.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present disclosure. Moreover, throughout the drawings, the same reference signs are used to denote the same components, in which.

DETAILED DESCRIPTION

Here, exemplary embodiments will be described in detail, examples of which are illustrated in the accompanying drawings. When reference is made to the drawings in the following description, identical reference numerals in different drawings denote identical or similar elements, unless otherwise indicated. The embodiments described in the following exemplary embodiments do not represent all implementations consistent with the present application. Rather, they are merely examples of devices and methods consistent with some aspects of the present application as detailed in the appended claims.

Terms used in the present application are for the purpose of describing particular embodiments only and are not intended to limit the application. The singular forms "a," "the," and "said" used in the present application and the appended claims are also intended to include plural forms, unless the context clearly dictates otherwise. It should also be understood that the term "and/or" as used herein refers to and encompasses any and all possible combinations of one or more associated listed items.

It should be understood that although terms such as "first," "second," "third," etc. may be used herein to describe various information, such information shall not be limited by these terms. These terms are only used to distinguish information of the same type from one another. For example, without departing from the scope of the present application, first information may also be referred to as second information, and similarly, second information may also be referred to as first information. Depending on the context, the word "if" as used herein may be interpreted as "when," "upon," or "in response to determining."

Embodiment 1

Figure 1:
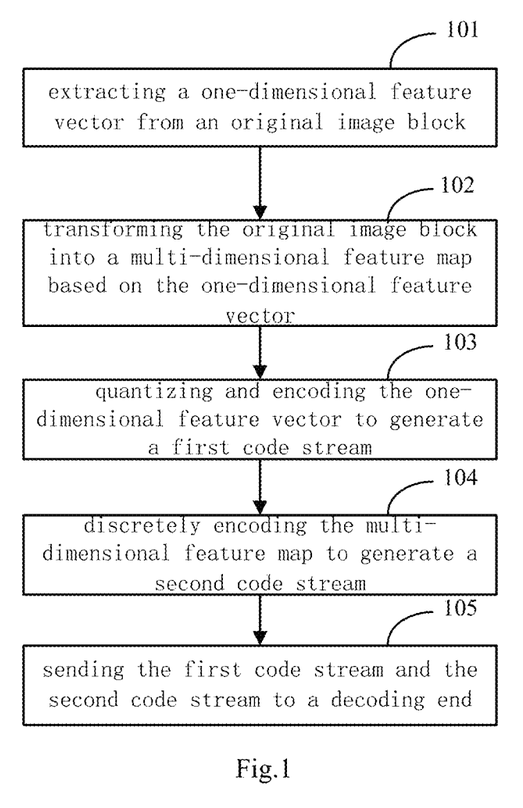
FIG. 1 is a flowchart of an embodiment of an image processing method according to an exemplary embodiment.

FIG. 1 is a flowchart of an image processing method according to an exemplary embodiment. This image processing method is applied at the encoding end, where the encoding end is used to compress and encode the original image into a bitstream. As shown in FIG. 1, the image processing method comprises the following steps:

Step 101: extract a one-dimensional feature vector from the original image block.

In this step, the original image block may be one of the blocks obtained by dividing the image to be encoded into blocks of a preset size, for example 32×32 pixels. The visual content representation of this one-dimensional feature vector contains the texture structure of the image. Because the feature has low dimensionality, its spatial correlation representation of the image is relatively weak, making it spatially independent.

In an optional embodiment, a preset convolutional encoder may be used to extract features from the original image block to obtain the one-dimensional feature vector. Specifically, the feature extraction formula is as follows:

$$z_t = Enc(x_0)$$

Where Enc( ) represents the convolutional encoder and $x_0$ denotes the input original image block.

Step 102: transform the original image block into a multi-dimensional feature map based on the one-dimensional feature vector.

In this step, the multi-dimensional feature map contains visual content representations of high-frequency information and structural information of the original image block. It is noteworthy that the multi-dimensional feature map has the same dimensions as the original image block.

In an optional embodiment, the original image block may be subjected to multiple iterations of noise addition using the one-dimensional feature vector via a preset diffusion model to obtain the multi-dimensional feature map.

Figure 2:
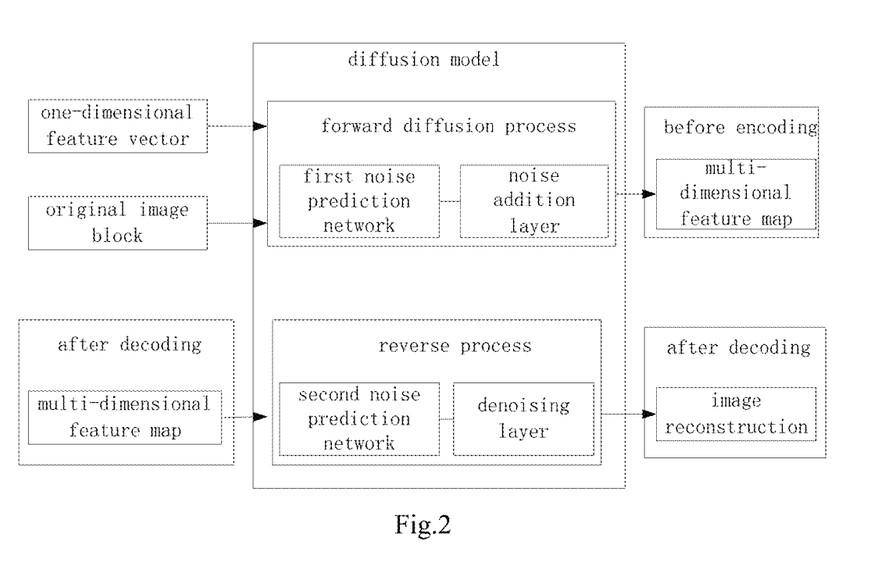
FIG. 2 is a structural diagram of a diffusion model according to an exemplary embodiment.

The diffusion model includes a forward diffusion process and a reverse process. The forward diffusion process adds noise iteratively to the original image block. The resulting multi-dimensional feature map is essentially a noisy image. Because the diffusion model is capable of preserving semantic structure and uses the one-dimensional feature vector to modulate the distribution of noise features (instead of simply adding Gaussian noise randomly at each step), the resulting noise image—which approximates a Gaussian distribution—contains high-frequency and structural information while preserving spatial resolution and spatial correlations between features.

In a specific implementation, as shown in FIG. 2, the diffusion model's forward process includes a first noise prediction network and a noise addition layer. During each iteration of the noise addition to the original image block, the current noise is predicted using the first noise prediction network based on the previous noise result and the one-dimensional feature vector. The predicted noise is then added to the previous result using the noise addition layer.

For the first noise addition, the previous result is the original image block. By using predicted deterministic noise instead of random Gaussian noise in the forward diffusion process, the traditional stochastic diffusion is converted into a deterministic encoding process. Because the predicted noise uses the one-dimensional feature vector and previous result as conditions to modulate the network's feature distribution, the predicted noise retains spatially correlated and structurally rich information. Consequently, the noisy image obtained after multiple iterations possesses both spatial correlation and high-frequency structural information.

Specifically, the noise addition layer performs the following operations: it retrieves the noise level coefficients used in the previous and current iterations, then computes the current noise-added result using the previous and current noise level coefficients, the predicted noise from the first noise prediction network, and the previous result.

An optional noise addition formula is as follows:

$$x_t = \frac{\sqrt{\alpha_t}\left(x_{t-1} - \sqrt{1-\alpha_{t-1}}\,\varepsilon_\theta(x_{t-1}, t-1, z_t)\right)}{\sqrt{\alpha_{t-1}}} + \sqrt{1-\alpha_t}\,\varepsilon_\theta(x_{t-1}, t-1, z_t)$$

Where: $x_t$ denotes the current noise-added result, $x_{t-1}$ denotes the previous result, $\varepsilon_A(x_{t-1}, t-1, z_t)$ denotes the predicted noise from the first noise prediction network, $z_t$ denotes the one-dimensional feature vector, $a_t$ denotes the current noise level coefficient, $a_{t-1}$ denotes the previous noise level coefficient. Note that the noise level coefficient represents the level of noise, with a range from 0 to 1, and it increases progressively—that is, the current coefficient is greater than the previous one.

The above formula is just one example. Other formulas capable of achieving the same noise-adding effect also fall within the scope of this application, and this application does not limit the specific form of the noise formula.

It should be noted that, as shown in FIG. 2, the diffusion model's reverse process (i.e., the denoising process), which will be described later in image reconstruction, also uses a noise prediction network for noise estimation. To ensure consistency between the encoding (noise-adding) and decoding (denoising), the first noise prediction network can be the same as the second noise prediction network used in the reverse process. Of course, the first and second noise prediction networks may also be different networks.

Based on the above, using the diffusion model to drive visual content representation enables high efficiency because the model does not need to consider image scene content during the generation process. Compared with existing generative image encoding techniques—which are limited in learning complex data distributions and require task-specific model optimization—this method offers stronger adaptability for representing a wide variety of image scenes.

Furthermore, because the diffusion model does not depend on scene content, the image can be divided into multiple blocks for separate encoding. This enables efficient encoding even for high-resolution images, which overcomes the resource, algorithm, and memory constraints of traditional generative encoding techniques.

Step 103: quantize and encode the one-dimensional feature vector to obtain the first code stream.

In this step, because the one-dimensional feature vector exhibits weak spatial correlation but strong local correlation, a locally correlated encoding method can be used to quantize and encode the feature vector along the feature dimensions. Examples include end-to-end image encoding methods and block-based intra-frame encoding methods for video.

In an optional embodiment, a preset quantization encoding model may be used to quantize and encode the one-dimensional feature vector to obtain the first code stream, thereby implementing end-to-end image encoding.

Figure 3:
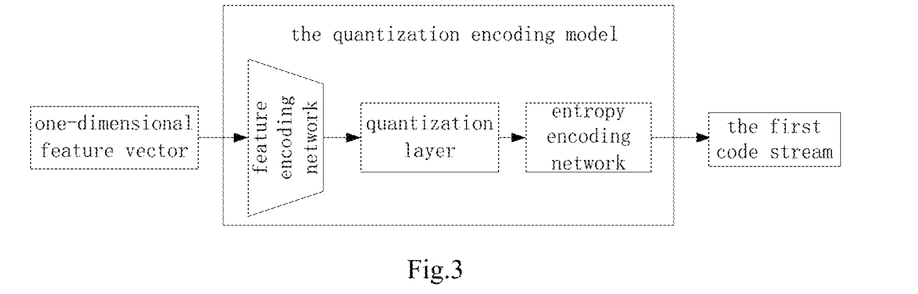
FIG. 3 a structural diagram of a quantization encoding model according to an exemplary embodiment.

In one implementation, as shown in FIG. 3, the quantization encoding model includes a feature encoding network, a quantization layer, and an entropy estimation network. The encoding process comprises: down-sampling the one-dimensional feature vector via the feature encoding network to obtain down-sampled features; converting the feature values of the down-sampled features into integer values using the quantization layer to obtain quantized features; encoding the quantized features into the first code stream using the entropy estimation network.

The integer values of the quantized features vary greatly. Therefore, an entropy estimation network is used to generate a probability table to encode the integer values into binary values for the first code stream.

As described earlier, the one-dimensional feature vector contains texture information of the image. Thus, the first code stream obtained from quantizing and encoding this vector carries image texture information, which facilitates texture reconstruction at the decoding end.

Step 104: discretely encode the multi-dimensional feature map to obtain the second code stream.

In this step, because the multi-dimensional feature map exhibits weak local correlation but strong spatial correlation, it is not suitable for locally correlated encoding methods. Instead, it is better suited for discrete representation-based encoding methods.

In an optional embodiment, a preset discrete encoding model can be used to encode the multi-dimensional feature map, generating the second code stream. This enables discrete representation-based image encoding.

Figure 4:
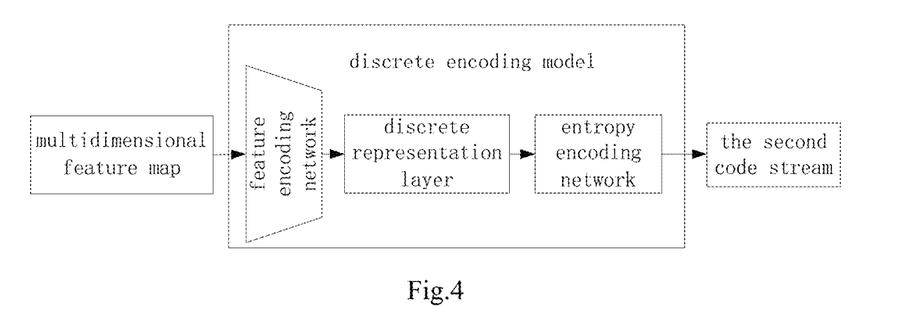
FIG. 4 is a structural diagram of a discrete encoding model according to an exemplary embodiment.

In one implementation, as shown in FIG. 4, the discrete encoding model includes a feature encoding network, a discrete representation layer, and a code stream conversion layer. The encoding process comprises: down-sampling the multi-dimensional feature map via the feature encoding network to obtain down-sampled features; applying discrete representation to the down-sampled features through the discrete representation layer to generate an index matrix; converting the index matrix into the second code stream via the code stream conversion layer.

The index values in the index matrix are derived from the indices of vectors in a feature dictionary used by the discrete representation layer. Since the index range is fixed, a conversion function can be designed in the code stream conversion layer to convert the indices into binary values to form the second code stream.

As previously noted, the multi-dimensional feature map contains high-frequency and structural information of the image. Thus, the second code stream obtained from its discrete encoding carries this information, which helps in accurate image reconstruction at the decoding end.

Specifically, during training, a feature dictionary is learned by clustering the multi-dimensional feature maps. This dictionary defines a discrete latent variable space, also known as embedding space, of size K×D, where K is the number of embedding vectors and D is the length of each embedding vector.

Based on this, the discrete representation process includes: matching each dimensional feature vector of the down-sampled features with the most similar vector in the preset feature dictionary; obtaining the index matrix using the indices of the matched vectors. The matching may use the Euclidean distance to find the nearest vector.

Step 105: send the first code stream and the second code stream to the decoding end.

With this, the image processing flow shown in FIG. 1 is complete. By extracting a one-dimensional, spatially independent feature vector from the original image block—which contains texture structure information—and transforming it into a multi-dimensional feature map—which contains both spatially correlated and high-frequency information—different aspects of the image are separately and efficiently encoded. The one-dimensional feature vector is quantized into the first code stream, and the multi-dimensional feature map is discretely encoded into the second code stream, thereby achieving efficient compression of multiple levels of image information. As the encoded bitstream consists of two layers containing different levels of information, even under low bitrate conditions, minimal information loss occurs. Thus, the reconstructed image from these two layers exhibits improved visual effects and a better user experience.

Embodiment 2

Figure 5:
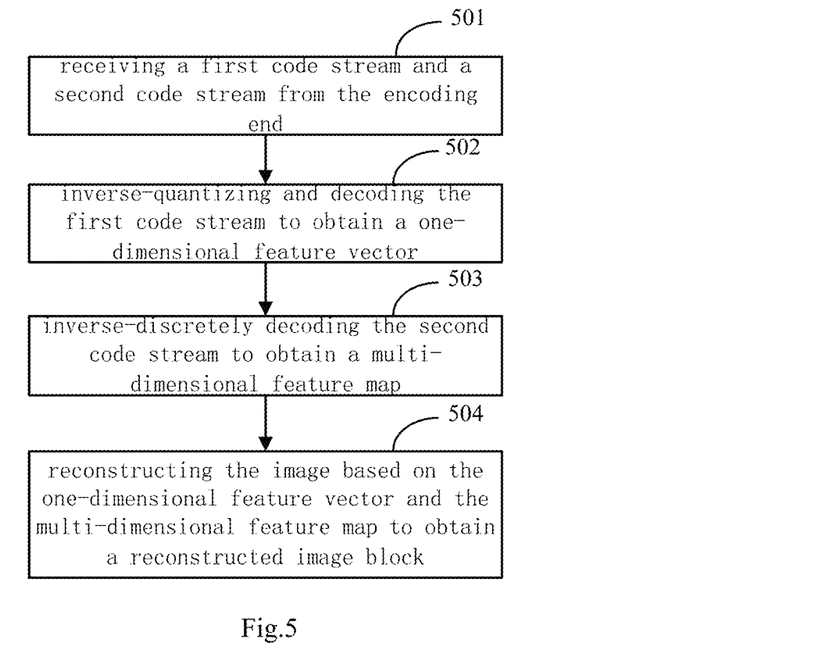
FIG. 5 is a flowchart of an embodiment of another image processing method according to an exemplary embodiment.

FIG. 5 is a flowchart of another image processing method according to an exemplary embodiment. Based on the image processing method described in FIG. 1 (encoding end), this embodiment presents a method applied at the decoding end. As shown in FIG. 5, the image processing method comprises the following steps:

Step 501: receive the first code stream and second code stream from the encoding end.

Step 502: inverse-quantize and decode the first code stream to obtain a one-dimensional feature vector.

In this step, as previously described, the first code stream is generated using a quantization encoding model. Correspondingly, decoding the first code stream involves using a preset inverse quantization decoding model to obtain the one-dimensional feature vector.

Figure 6:
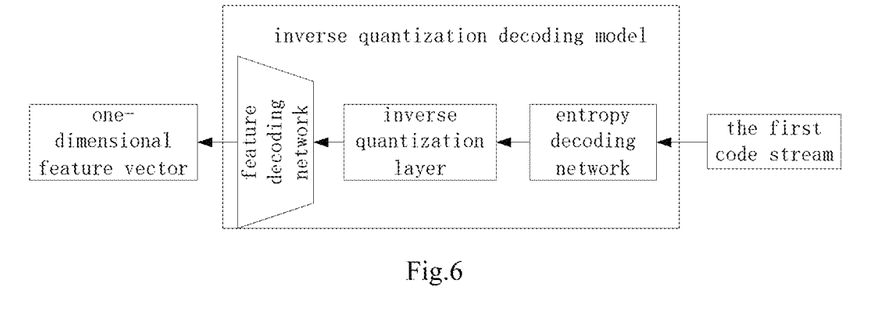
FIG. 6 is a structural diagram of a quantization decoding model according to an exemplary embodiment.

In one feasible implementation, as shown in FIG. 6, the inverse quantization decoding model includes an entropy decoding network, an inverse quantization layer, and a feature decoding network. The decoding process includes: decoding the first code stream into quantized features using the entropy decoding network; converting the quantized features into floating-point values using the inverse quantization layer to obtain inverse-quantized features; up-sampling the inverse-quantized features via the feature decoding network to obtain the one-dimensional feature vector.

Step 503: inverse-discretely decode the second code stream to obtain the multi-dimensional feature map.

In this step, as previously described, the second code stream is generated using a discrete encoding model. Correspondingly, decoding the second code stream involves using a preset discrete decoding model to obtain the multi-dimensional feature map.

Figure 7:
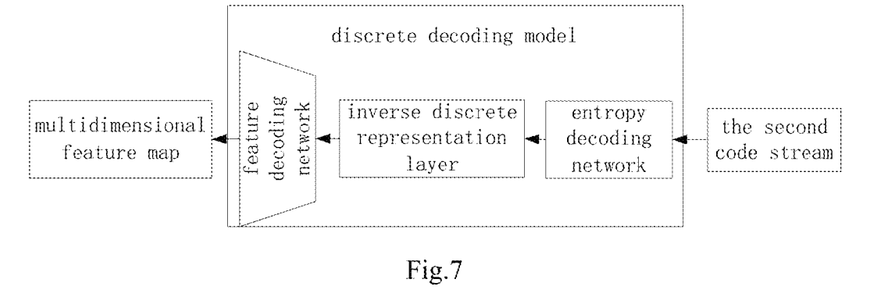
FIG. 7 is a structural diagram of a discrete decoding model according to an exemplary embodiment.

In one feasible implementation, as shown in FIG. 7, the discrete decoding model includes a code stream decoding layer, an inverse discrete representation layer, and a feature decoding network. The decoding process includes: decoding the second code stream into an index matrix using the code stream decoding layer; converting the index matrix into continuous features based on a preset feature dictionary using the inverse discrete representation layer; up-sampling the continuous features using the feature decoding network to obtain the multi-dimensional feature map.

Here, the feature dictionary used by the inverse discrete representation layer is the same as that used by the discrete representation layer, to facilitate decoding the index matrix. Based on the previously described discrete representation process, the conversion of the index matrix into continuous features involves using the corresponding embedding vectors from the feature dictionary to represent each index in the matrix.

Step 504: reconstruct the image based on the one-dimensional feature vector and the multi-dimensional feature map to obtain the reconstructed image block.

As previously described, since the multi-dimensional feature map is generated using the forward diffusion process of the diffusion model, image reconstruction from the multi-dimensional feature map uses the reverse process of the diffusion model, namely denoising decoding.

Based on this, a preset diffusion model is used to perform multiple iterations of denoising on the multi-dimensional feature map using the one-dimensional feature vector, thereby obtaining the reconstructed image block.

In one feasible implementation, as shown in FIG. 2, the reverse process of the diffusion model includes a second noise prediction network and a denoising layer. During each iteration of denoising the multi-dimensional feature map, the current noise is predicted using the second noise prediction network based on the previous denoising result and the one-dimensional feature vector. The predicted noise is then applied to denoise the previous result using the denoising layer.

For the first denoising process, the previous result is the multi-dimensional feature map. Specifically, the denoising process in the denoising layer includes: acquiring the noise level coefficients used in the previous and current iterations; calculating the current denoising result based on the previous coefficient, current coefficient, the predicted noise from the second noise prediction network, and the previous result.

Based on the noise addition formula described earlier, the corresponding optional denoising formula is:

$$x_{t-1} = \sqrt{\alpha_{t-1}} \frac{(x_t - \sqrt{1-\alpha_t}\, \varepsilon_\theta(x_t, t, z_t))}{\sqrt{\alpha_t}} + \sqrt{1-\alpha_{t-1}}\, \varepsilon_\theta(x_t, t, z_t)$$

Where: $x_t$ denotes the previous denoising result, $x_{t-1}$ denotes the current denoising result, $\varepsilon_\theta(x_t,t,z_t)$ denotes the predicted noise from the second noise prediction network, $z_t$ denotes the one-dimensional feature vector, $a_t$ denotes the previous noise level coefficient, $a_{t-1}$ denotes the current noise level coefficient.

With this, the image processing flow shown in FIG. 5 is complete. Since the received first and second code streams contain different levels of image information (the first carries texture style information and the second carries high-frequency and structural information), the reconstructed image obtained by decoding both streams offers enhanced visual quality and preserves more information even under limited bandwidth conditions.

The execution body of the embodiment in the present application may be an application, a service, an instance, a software-based functional module, a virtual machine (VM), a container, a cloud server, or other hardware device (such as a server or terminal device) or hardware chip (such as CPU, GPU, FPGA, NPU, AI accelerator card, or DPU) capable of data processing. The image processing device may be deployed on the computing equipment of the application provider or on a cloud computing platform that provides computing power, storage, and network resources. The service model provided by the cloud computing platform may be IaaS (Infrastructure as a Service), PaaS (Platform as a Service), Saas (Software as a Service), or DaaS (Data as a Service). For example, under the SaaS model (Software as a Service), the cloud computing platform may provide training of the image processing model or execution of image processing functionalities using its own computing resources. The specific application architecture can be built based on service requirements. For instance, the platform may offer image processing model building services to application providers or individuals using the platform's resources. Furthermore, based on image processing requests submitted by relevant clients or servers, the model can be invoked to achieve online or offline image processing.

Building on the basis of the embodiments shown in FIGS. 1 and 5, the present application further proposes an image processing system comprising an encoding end and a decoding end. The encoding end is used to execute the image processing method described in the embodiment shown in FIG. 1. The decoding end is used to execute the image processing method described in the embodiment shown in FIG. 5.

Next, the encoding and decoding ends will be described together to provide a detailed explanation of the image processing method proposed in this application.

Figure 8:
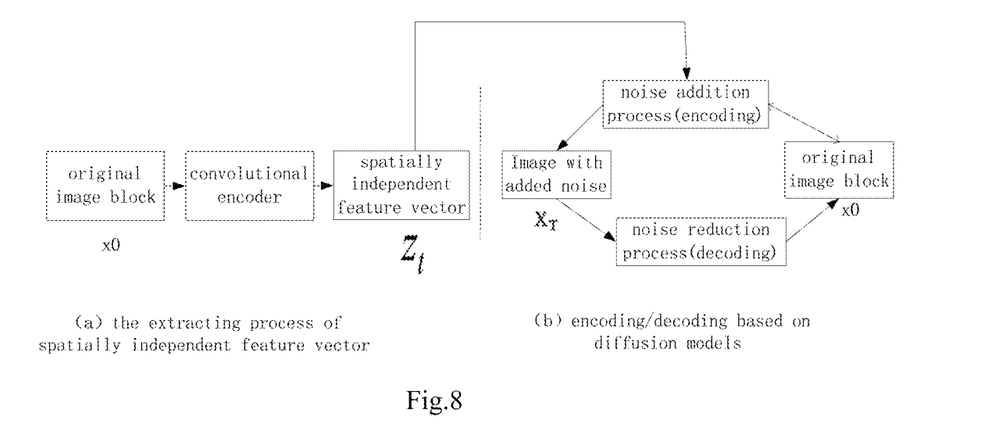
FIG. 8 to FIG. 11 are schematic diagrams for implementing image processing according to an exemplary embodiment.
Figure 9:
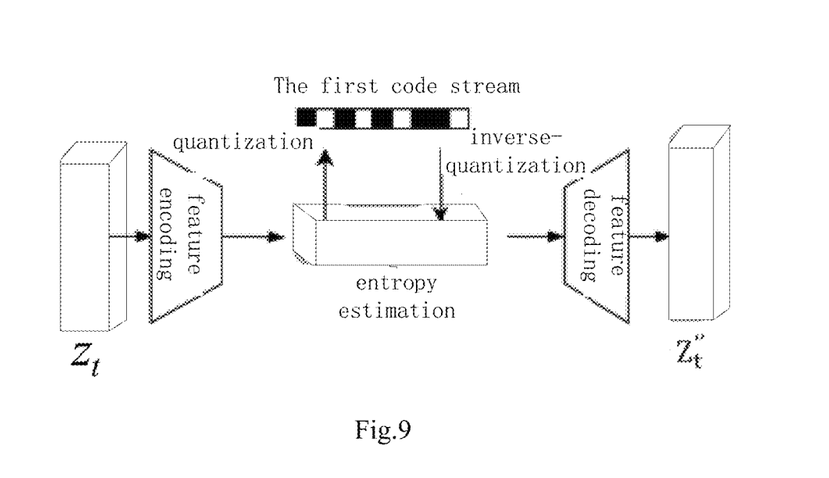
Figure 10:
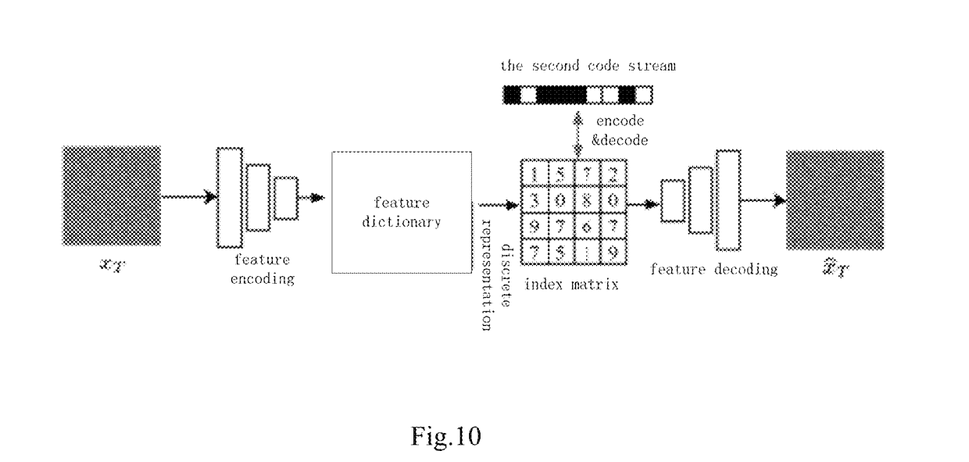

At the encoding end: as shown in FIG. 8, a convolutional encoder extracts a spatially independent feature vector $z_t$ (i.e., the one-dimensional feature vector) from the original image block $x_0$. Based on the forward diffusion process of the diffusion model, noise is added to $x_0$ step-by-step under the guidance of the spatially independent feature vector $Z_t$, resulting in a noisy image $X_T$ (i.e., the multi-dimensional feature map). Then, as shown in FIG. 9, the quantization encoding model is used to perform feature encoding, quantization, and entropy estimation on the feature vector $Z_t$ to obtain the first code stream. As shown in FIG. 10, the discrete encoding model is used to perform feature encoding and discrete representation on the noisy image $X_T$, generating an index matrix that is converted into the second code stream.

At the decoding end: as shown in FIG. 9, the first code stream is processed by the inverse quantization decoding model to obtain the reconstructed spatially independent feature vector $Z''_t$.

As shown in FIG. 10, the second code stream is processed by the discrete decoding model to obtain the reconstructed noisy image $\hat{X}_T$. Then, as shown in FIG. 8, based on the reverse diffusion process of the diffusion model, the reconstructed spatially independent feature vector $Z''_t$ is used to iteratively denoise $\hat{X}_T$, resulting in the reconstructed image block.

Figure 11:
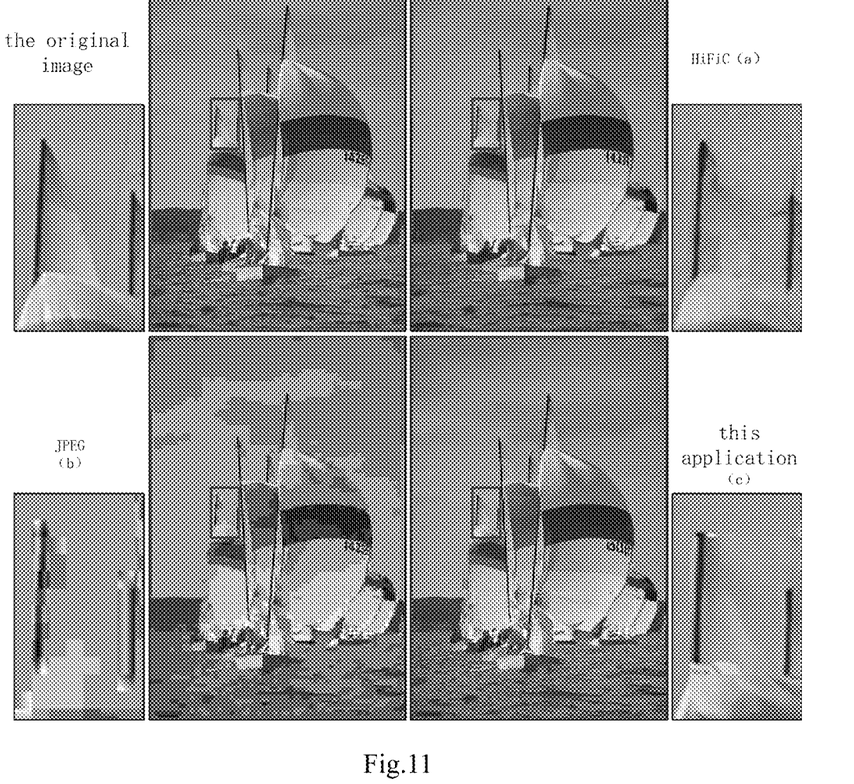

Based on the above description, as shown in FIG. 11, the same input image is encoded and reconstructed using three different methods for comparison: HiFiC scheme produces image "a"; JPEG scheme produces image "b"; The method of this application produces image "c". Screenshots of the same region in the original image and images a, b, and c are compared. The results show that the reconstructed images from HiFiC and JPEG exhibit artifacts, whereas the reconstructed image from the present invention has no noticeable artifacts and is nearly identical to the original.

Corresponding to the image processing method described above, the present application also provides an embodiment of an image processing device used to execute the method shown in FIG. 1. This device is applied at the encoding end and includes:

A first extraction module, used to extract a one-dimensional feature vector from an original image block;

A second extraction module, used to transform the original image block into a multi-dimensional feature map based on the one-dimensional feature vector;

A first encoding module, used to quantize and encode the one-dimensional feature vector to obtain the first code stream;

A second encoding module, used to discretely encode the multi-dimensional feature map to obtain the second code stream;

A sending module, used to send the first code stream and the second code stream to the decoding end.

Transforming the original image block into a multi-dimensional feature map based on the one-dimensional feature vector includes:

In an optional implementation, the second extraction module is specifically used to perform multiple iterations of noise addition on the original image block using the one-dimensional feature vector via a preset diffusion model to obtain the multi-dimensional feature map.

In another optional implementation, the diffusion model includes a first noise prediction network and a noise addition layer. The second extraction module is specifically used to, for each noise addition process, predict the current noise using the first noise prediction network based on the previous result and the one-dimensional feature vector; and add the predicted noise to the previous result through the noise addition layer. For the first iteration, the previous result is the original image block.

In another optional implementation, the second extraction module is used to obtain the previous and current noise level coefficients, and calculate the current result based on the coefficients, the predicted noise, and the previous result.

In an optional implementation, the first encoding module is used to quantize and encode the one-dimensional feature vector through a preset quantization encoding model to obtain the first code stream.

The quantization encoding model includes a feature encoding network, a quantization layer, and an entropy estimation network. The first encoding module is used to: down-sample the one-dimensional feature vector via the feature encoding network to obtain down-sampled features; convert the features to integer values via the quantization layer to obtain quantized features; encode the quantized features into the first code stream via the entropy estimation network.

In an optional implementation, the second encoding module is used to discretely encode the multi-dimensional feature map via a preset discrete encoding model to obtain the second code stream.

The discrete encoding model includes a feature encoding network, a discrete representation layer, and a code stream conversion layer. The second encoding module is used to: down-sample the multi-dimensional feature map via the feature encoding network; apply discrete representation on the down-sampled features via the discrete representation layer to obtain an index matrix; convert the index matrix into the second code stream via the code stream conversion layer.

In another optional implementation, during discrete representation, the second encoding module matches each dimensional feature vector of the down-sampled features to the most similar vector in a preset feature dictionary and uses the index of the matched vector to construct the index matrix.

Corresponding to the image processing method shown in FIG. 5, the present application also provides another embodiment of an image processing device, applied at the decoding end. This device includes:

A receiving module, configured to receive the first code stream and second code stream from the encoding end;

A first decoding module, configured to inverse-quantize and decode the first code stream to obtain a one-dimensional feature vector;

A second decoding module, configured to inverse-discretely decode the second code stream to obtain a multi-dimensional feature map;

A reconstruction module, configured to reconstruct an image based on the one-dimensional feature vector and the multi-dimensional feature map to obtain a reconstructed image block.

In an optional implementation, the first decoding module is used to inverse-quantize and decode the first code stream via a preset inverse quantization decoding model to obtain the one-dimensional feature vector.

The inverse quantization decoding model includes an entropy decoding network, an inverse quantization layer, and a feature decoding network. The first decoding module is used to: decode the first code stream into quantized features via the entropy decoding network; convert the quantized features into floating-point values via the inverse quantization layer to obtain inverse quantized features; up-sample the inverse quantized features via the feature decoding network to obtain the one-dimensional feature vector.

In an optional implementation, the second decoding module is used to inverse-discretely decode the second code stream via a preset discrete decoding model to obtain the multi-dimensional feature map.

The discrete decoding model includes a code stream decoding layer, an inverse discrete representation layer, and a feature decoding network. The second decoding module is used to: decode the second code stream into an index matrix via the code stream decoding layer; convert the index matrix into continuous features via the inverse discrete representation layer based on a preset feature dictionary; up-sample the continuous features via the feature decoding network to obtain the multi-dimensional feature map.

In an optional implementation, the reconstruction module is used to apply a preset diffusion model and perform multiple iterations of denoising on the multi-dimensional feature map using the one-dimensional feature vector to obtain the reconstructed image block.

In an optional implementation, the diffusion model includes a second noise prediction network and a denoising layer. The reconstruction module is used to: for each denoising process, predict the current noise using the second noise prediction network based on the previous result and the one-dimensional feature vector; denoise the previous result using the predicted noise via the denoising layer. For the first iteration, the previous result is the multi-dimensional feature map.

In another optional implementation, the reconstruction module is used to: obtain the previous and current noise level coefficients; calculate the current result based on the coefficients, the predicted noise, and the previous result.

The functions and implementation processes of the modules described above correspond to the steps described earlier in the method, and will not be repeated here.

For the apparatus embodiments, as they basically correspond to the method embodiments, the relevant parts can refer to the previous descriptions. The above-described device embodiments are merely exemplary. The described modules may or may not be physically separate. The components shown as modules may or may not be physical units. They may be located in one place or distributed across multiple network nodes. Depending on actual needs, parts or all of the modules may be selected to realize the solutions of the present application. A person skilled in the art can implement them without inventive effort.

The present application also provides an electronic device corresponding to the image processing method described above. The device includes a communication interface, a processor, a memory, and a bus. The communication interface, processor, and memory communicate via the bus. The processor reads and executes machine-executable instructions in the memory corresponding to the control logic of the image processing method to perform the method described above.

The memory may be any electronic, magnetic, optical, or other physical storage device and may store information such as executable instructions and data. Specifically, the memory may be RAM, flash memory, hard disk drive, optical disk, DVD, or other similar storage media, or combinations thereof. At least one communication interface (wired or wireless) enables the system element to connect and communicate with other network elements, using the Internet, WAN, LAN, MAN, etc.

The bus may be an ISA, PCI, or EISA bus. It can include address, data, and control buses. The memory stores the program, and the processor executes the program when instructions are received.

The processor may be an integrated circuit chip with signal processing capabilities. During implementation, each step of the above method can be completed via hardware logic circuits or software instructions within the processor. The processor may be a general-purpose processor such as a network processor (NP), digital signal processor (DSP), application-specific integrated circuit (ASIC), field programmable gate array (FPGA), or other programmable logic device. These can implement the methods, steps, and logic flow diagrams disclosed herein. The general-purpose processor may be a microprocessor or any conventional processor. The method steps disclosed in the present application may be implemented via hardware decoders or combinations of hardware and software modules.

The electronic device provided in this embodiment and the image processing method share the same inventive concept and have the same beneficial effects.

Those skilled in the art, in light of the specification and implementation of the disclosed invention, will easily conceive of other embodiments of this application. This application intends to cover any modifications, uses, or adaptations within the general principles of the invention, including known practices or conventional technologies in the field not explicitly disclosed herein. The description and examples should be regarded as illustrative, and the true scope and spirit of the invention shall be defined by the claims.

It should be further noted that the terms "include," "comprise," and their variants are intended to be non-exclusive. Thus, a process, method, article, or device including a series of elements not only includes those elements explicitly listed but may also include other elements not listed explicitly or inherent to such a process, method, article, or device. Without more limitation, elements defined by "comprising one . . . " do not exclude the presence of additional identical elements in the method, article, or device.

The above description is only the preferred embodiment of the present application and is not intended to limit the application. Any modifications, equivalent replacements, or improvements made within the spirit and principles of the present application shall fall within the scope of protection of the present application.

The invention claimed is:

1. An image processing method, characterized in that, applied at an encoding end, the method comprises:
   extracting a one-dimensional feature vector from an original image block; transforming the original image block into a multi-dimensional feature map based on the one-dimensional feature vector;

quantizing and encoding the one-dimensional feature vector to generate a first code stream;
discretely encoding the multi-dimensional feature map to generate a second code stream;
sending the first code stream and the second code stream to a decoding end;
wherein the step of transforming the original image block into a multi-dimensional feature map based on the one-dimensional feature vector includes:
iteratively adding noise to the original image block multiple times using the one-dimensional feature vector through a preset diffusion model, thereby obtaining the multi-dimensional feature map.

2. The method according to claim 1, wherein the diffusion model comprises a first noise prediction network and a noise addition layer;
the step of iteratively adding noise to the original image block multiple times using the one-dimensional feature vector through the preset diffusion model includes:
for each noise addition process, predicting the current noise using the first noise prediction network based on the previous noise addition result and the one-dimensional feature vector;
adding the noise predicted by the first noise prediction network to the result from the previous iteration using the noise addition layer;
wherein, for the first noise addition process, the previous noise addition result is the original image block.

3. The method according to claim 2, wherein the step of adding the noise predicted by the first noise prediction network to the result from the previous iteration using the noise addition layer includes:
acquiring the noise level coefficient previously used and the current noise level coefficient;
obtaining the current noise addition result based on the previously used noise level coefficient, the current noise level coefficient, the noise output by the first noise prediction network, and the previous noise addition result.

4. The method according to claim 1, wherein the step of quantizing and encoding the one-dimensional feature vector to generate a first code stream includes:
quantizing and encoding the one-dimensional feature vector through a preset quantization encoding model to obtain the first code stream.

5. The method according to claim 4, wherein the quantization encoding model comprises a feature encoding network, a quantization layer, and an entropy estimation network;
the step of quantizing and encoding the one-dimensional feature vector through the preset quantization encoding model to obtain the first code stream includes:
down-sampling the one-dimensional feature vector via the feature encoding network to obtain down-sampled features;
converting feature values of the down-sampled features to integer values through the quantization layer to obtain quantized features;
encoding the quantized features into the first code stream using the entropy estimation network.

6. The method according to claim 1, wherein the step of discretely encoding the multi-dimensional feature map to generate a second code stream includes:
discretely encoding the multi-dimensional feature map through a preset discrete encoding model to obtain the second code stream.

7. The method according to claim 6, wherein the discrete encoding model comprises a feature encoding network, a discrete representation layer, and a code stream conversion layer;
the step of discretely encoding the multi-dimensional feature map through the preset discrete encoding model to obtain the second code stream includes:
down-sampling the multi-dimensional feature map via the feature encoding network to obtain down-sampled features;
performing discrete representation on the down-sampled features using the discrete representation layer to obtain an index matrix;
converting the index matrix into the second code stream via the code stream conversion layer.

8. The method according to claim 7, wherein the step of performing discrete representation on the down-sampled features through the discrete representation layer to obtain an index matrix includes:
matching each dimensional feature vector of the down-sampled features with the most similar vector in a preset feature dictionary;
obtaining the index matrix using the indices of vectors matched with each dimensional feature vector.

9. An electronic device, comprising a memory, a processor, and a computer program stored on the memory and executable on the processor, characterized in that the processor executes the program to implement the method according to claim 1.

10. A computer-readable storage medium, on which a computer program is stored, characterized in that the program is executed by a processor to implement the method according to claim 1.

11. An image processing method, characterized in that, applied at a decoding end, the method comprises:
receiving a first code stream and a second code stream from an encoding end;
inverse-quantizing and decoding the first code stream to obtain a one-dimensional feature vector;
inverse-discretely decoding the second code stream to obtain a multi-dimensional feature map;
reconstructing the image based on the one-dimensional feature vector and the multi-dimensional feature map to obtain a reconstructed image block;
wherein the step of reconstructing the image based on the one-dimensional feature vector and the multi-dimensional feature map includes iteratively denoising the multi-dimensional feature map multiple times using the one-dimensional feature vector through a preset diffusion model, thereby obtaining the reconstructed image block.

12. The method according to claim 11, wherein the step of inverse-quantizing and decoding the first code stream includes:
inverse-quantizing and decoding the first code stream through a preset inverse quantization decoding model to obtain the one-dimensional feature vector;
the inverse quantization decoding model comprises an entropy decoding network, an inverse quantization layer, and a feature decoding network;
the decoding step includes decoding the first code stream into quantized features using the entropy decoding network;
converting the quantized features to floating-point values via the inverse quantization layer to obtain inverse quantized features;

up-sampling the inverse quantized features through the feature decoding network to obtain the one-dimensional feature vector.

13. The method according to claim 11, wherein the step of inverse-discretely decoding the second code stream includes:
inverse-discretely decoding the second code stream through a preset discrete decoding model to obtain the multi-dimensional feature map;
the discrete decoding model comprises a code stream decoding layer, an inverse discrete representation layer, and a feature decoding network;
the decoding step includes decoding the second code stream into an index matrix via the code stream decoding layer;
converting the index matrix to continuous features through the inverse discrete representation layer using a preset feature dictionary;
up-sampling the continuous features via the feature decoding network to obtain the multi-dimensional feature map.

14. The method according to claim 11, wherein the diffusion model comprises a second noise prediction network and a denoising layer;
the iterative denoising step includes predicting the current noise using the second noise prediction network based on the previous denoising result and the one-dimensional feature vector for each denoising process;
denoising the previous denoising result using the noise output by the second noise prediction network via the denoising layer;
wherein for the first denoising process, the previous denoising result is the multi-dimensional feature map.

15. The method according to claim 14, wherein the denoising step via the denoising layer includes:
acquiring the previously used noise level coefficient and the current noise level coefficient;
obtaining the current denoising result based on the previously used noise level coefficient, the current noise level coefficient, the noise output by the second noise prediction network, and the previous denoising result.

16. An image processing system, characterized in that the system comprises:
an encoding end, configured to execute an encoding image processing method,
the encoding image processing method comprises:
extracting a one-dimensional feature vector from an original image block;
transforming the original image block into a multi-dimensional feature map based on the one-dimensional feature vector;
quantizing and encoding the one-dimensional feature vector to generate a first code stream;
discretely encoding the multi-dimensional feature map to generate a second code stream;
sending the first code stream and the second code stream to a decoding end;
wherein the step of transforming the original image block into a multi-dimensional feature map based on the one-dimensional feature vector includes:
iteratively adding noise to the original image block multiple times using the one-dimensional feature vector through a preset diffusion model, thereby obtaining the multi-dimensional feature map and;
a decoding end, configured to execute a decoding image processing method,
the decoding image processing method comprises:
receiving a first code stream and a second code stream from the encoding end;
inverse-quantizing and decoding the first code stream to obtain a one-dimensional feature vector;
inverse-discretely decoding the second code stream to obtain a multi-dimensional feature map;
reconstructing the image based on the one-dimensional feature vector and the multi-dimensional feature map to obtain a reconstructed image block;
wherein the step of reconstructing the image based on the one-dimensional feature vector and the multi-dimensional feature map includes iteratively denoising the multi-dimensional feature map multiple times using the one-dimensional feature vector through a preset diffusion model, thereby obtaining the reconstructed image block.

* * * * *